United States Patent
Ziegler et al.

(10) Patent No.: US 7,141,331 B2
(45) Date of Patent: Nov. 28, 2006

(54) BATTERY PACK

(75) Inventors: Bernd Ziegler, Hiltenfingen (DE); Rainer Ontl, Landsberg am Lech (DE)

(73) Assignee: Hilt Aktiengesellschaft, Schaan (LI)

( * ) Notice: Subject to any disclaimer, the term of this patent is extended or adjusted under 35 U.S.C. 154(b) by 208 days.

(21) Appl. No.: 10/686,851

(22) Filed: Oct. 15, 2003

(65) Prior Publication Data

US 2004/0081885 A1 Apr. 29, 2004

(30) Foreign Application Priority Data

Oct. 29, 2002 (DE) ................. 102 50 240

(51) Int. Cl.
*H01M 10/50* (2006.01)
*H01M 2/00* (2006.01)

(52) U.S. Cl. ................. 429/120; 429/148; 429/156; 429/154; 429/159; 429/99; 429/100; 429/96; 429/82; 429/149

(58) Field of Classification Search ............... 429/120, 429/148, 156, 154, 159, 99, 100, 96, 82, 429/149

See application file for complete search history.

(56) References Cited

U.S. PATENT DOCUMENTS

| | | | |
|---|---|---|---|
| 6,255,015 B1* | 7/2001 | Corrigan et al. | 429/149 |
| 6,818,343 B1* | 11/2004 | Kimoto et al. | 429/99 |
| 2003/0082439 A1* | 5/2003 | Sakakibara | 429/120 |
| 2005/0130033 A1* | 6/2005 | Iwamura et al. | 429/159 |

FOREIGN PATENT DOCUMENTS

JP  2002-42753  * 2/2002

* cited by examiner

*Primary Examiner*—Patrick Joseph Ryan
*Assistant Examiner*—Angela J. Martin
(74) *Attorney, Agent, or Firm*—Abelman Frayne & Schwab

(57) ABSTRACT

A battery pack includes a housing (3) having a plurality of cooling opening (2a, 2b) formed therein, and at least one separation wall (5) formed of a plurality of current cells (4) arranged flow-tight adjacent to each other, with the at least one separation wall (5) being arranged between at least two cooling openings (2a, 2b) and projecting flow-tight into an interior at the housing (3) at the side of the openings, so that the separation wall (5) is cooled by an air stream flowing therearound.

9 Claims, 3 Drawing Sheets

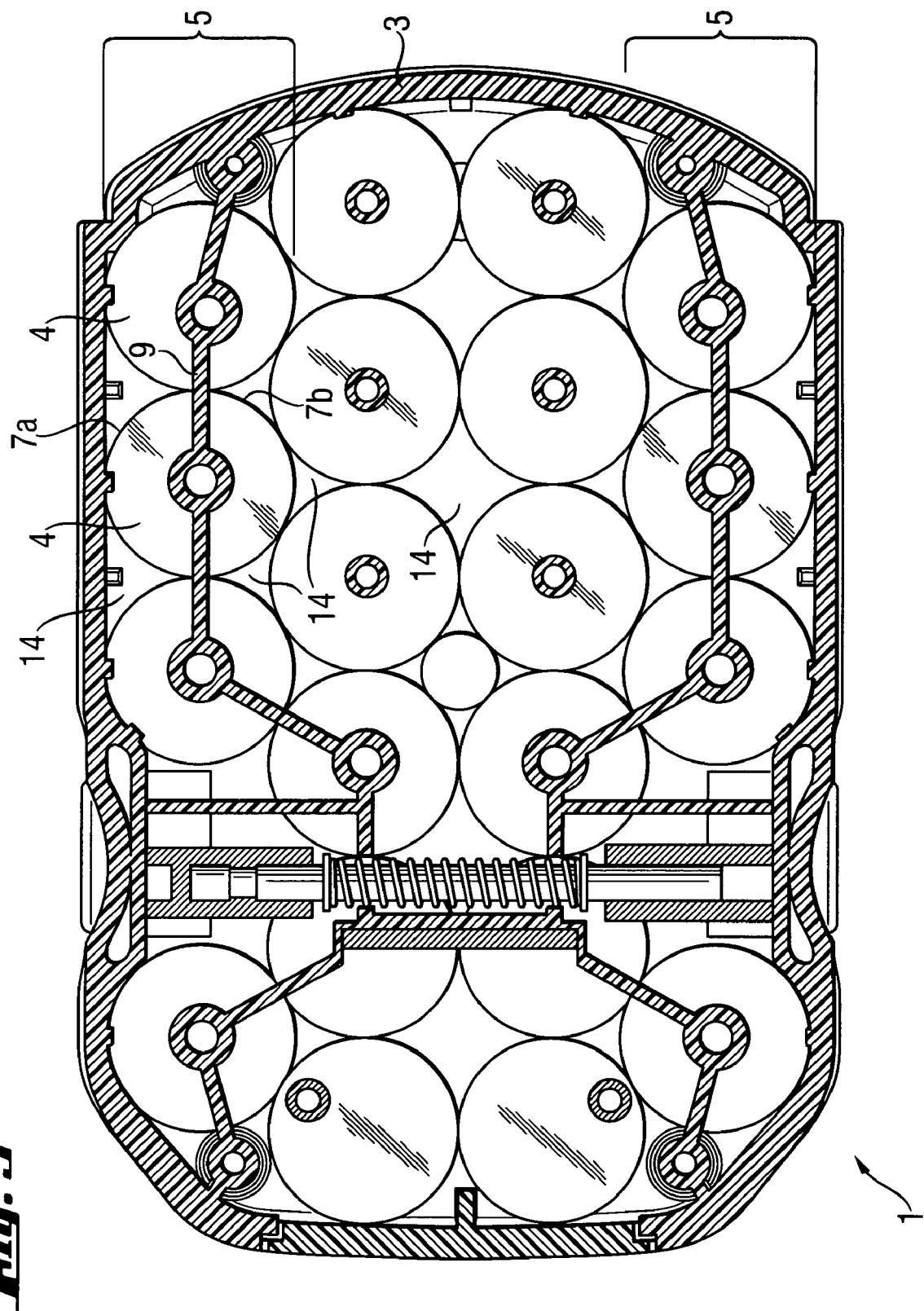

BATTERY PACK

BACKGROUND OF THE INVENTION

1. Field of the Invention

The present invention relates to a battery pack and, in particular, to a battery pack for electrical hand-held power tools.

2. Description of the Prior Art

A battery pack for electrical hand-held power tool contains a plurality of rechargeable current cells, e.g., Li-ionic current cells. During charging, in particular during rapid charging, the generated heat of the current cells should be removed to prevent a damaging overheating of the current cells. Usually, the battery housing has a plurality of aeration openings which provide for flow along the cells of a cooling air current that is generated by an associated charging apparatus.

European Publication EP-1 069 637 discloses a battery pack with cooling openings and a sealed block of arranged parallel to each other, current cells located between two plates. The plates are provided with pressure distributing openings, with flow paths running between separate openings. However, the cooling openings, which are provided on opposite sides of the battery pack, facilitate penetration of dirt and moisture into the battery pack, which reduces its service life.

German Publication DE-100 55 158 discloses a battery pack with cooling openings provided on one side of the pack. The battery pack includes two walls formed of current cells and internal air distribution means for uniform cooling. The cooling air distribution means includes two spaced from each other plates extending along the current cells. With this arrangement, three air streams are formed transverse to the cell axes, with two streams flowing along opposite sides of the wall, which is formed by the cells, in the same direction. The air streams that flow in the same direction transverse to the axial extent of the current cells course, because of heating of the streams, produce a non-uniform and, thereby, inefficient cooling which, in case of local heat accumulation, reduces the services life, despite the cooling.

Accordingly, an object of the present invention is to provide a battery pack with a technologically simple efficient cooling.

SUMMARY OF THE INVENTION

This and other objects of the present invention, which will become apparent hereinafter, are achieved by providing a battery pack that includes housing having a plurality of cooling openings formed therein, and at least one separation wall formed of a plurality of current cells arranged flow-tight adjacent to each other, with the at least one separation wall being arranged between at least two cooling openings and projecting flow-tight into an interior of the housing at a side of the openings, whereby the separation wall is cooled by an air stream flowing therearound.

Upon connection of the battery housing with an external ventilator of a charging apparatus or a consumer, an air volume, which enters through the at least one opening and exits the at least one another opening can flow, in form of an air stream, in opposite direction along opposite sides of the at least one separation wall which projects flow-tight into the interior of the battery housing and is cooled by the air stream that flows around it.

With opposite flow directions of the air stream, a separation wall, which is formed of a single row or several rows of the current cells, can be uniformly and, thus, efficiently cooled with regard to the axial regions along the cell axes. This is because a summary cooling effect of the incoming cooler stream and the warmer return stream, which flow parallel to the cell axis, will be the same for all axial regions. Uniform cooling of all of the axial regions prevents service life-reducing local heat accumulation at the cells.

Advantageously, the first and second cooling openings are arranged at the open side of the housing which is adjoined flow-tight by the separation wall. The necessary inner-side reversal of the flow direction of the air stream takes place at a side of the wall opposite the side at which the wall adjoins the open side of the battery housing. This permits to avoid use of additional flow deflection means.

Advantageously, the current cells are axially supported on a web projecting inward from the open side of the housing and arranged between the first cooling opening and the second cooling opening. This permits to realize a flow-tight attachment of the current cells and of the separation wall.

Advantageously, there are provided three or more cooling openings, with a separation wall being arranged between each two respective openings. With such an arrangement, several air streams, which are independent from each other can be obtained.

Advantageously, the cooling openings and the separation walls are symmetrically, preferably, mirror-symmetrically arranged in the housing. With such an arrangement, the cooling air can be aspirated into the housing through two first cooling openings, which are provided in opposite outer regions of the housing, and exit through a common central opening the axis of which coincides with the axis of symmetry. To obtain an air stream, simple suction means such as a ventilator of a charging device or of a consumer, such as an electrical hand held power tool, can be flow-tight associated with the housing.

Advantageously, electrical contact means is provided at the open side of the battery housing. With a corresponding mounting, the cooling openings do not immediately lie on a contact side of an associated charging apparatus or consumer. This reduces penetration of moisture and dirt into the housing.

Advantageously, there is provided air distribution means which is formed, advantageously, of a plurality of cooling openings provided on a side of a separation wall and spaced from each other. The air distribution means provides for a uniform distribution of the pressure difference, which is produced by the air stream, in form of separate air streams. A plurality of air streams reduces local heat accumulation.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 3 a longitudinal cross-sectional view along line III—III in FIG. 2.

DETAILED DESCRIPTION OF THE PREFERRED EMBODIMENTS

Figure 1:
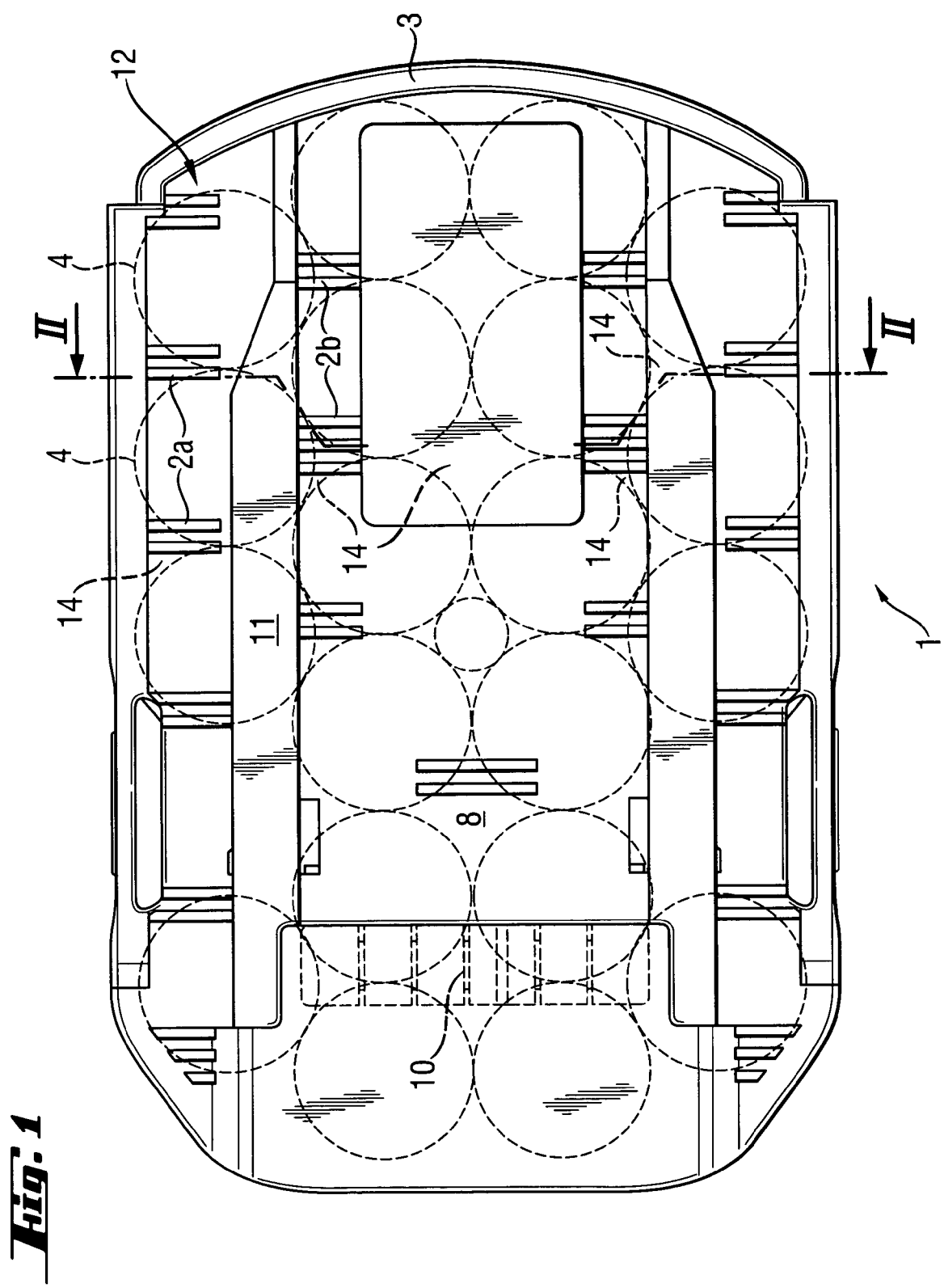
FIG. 1 a plan view of a battery pack according to the present invention.
Figure 2:
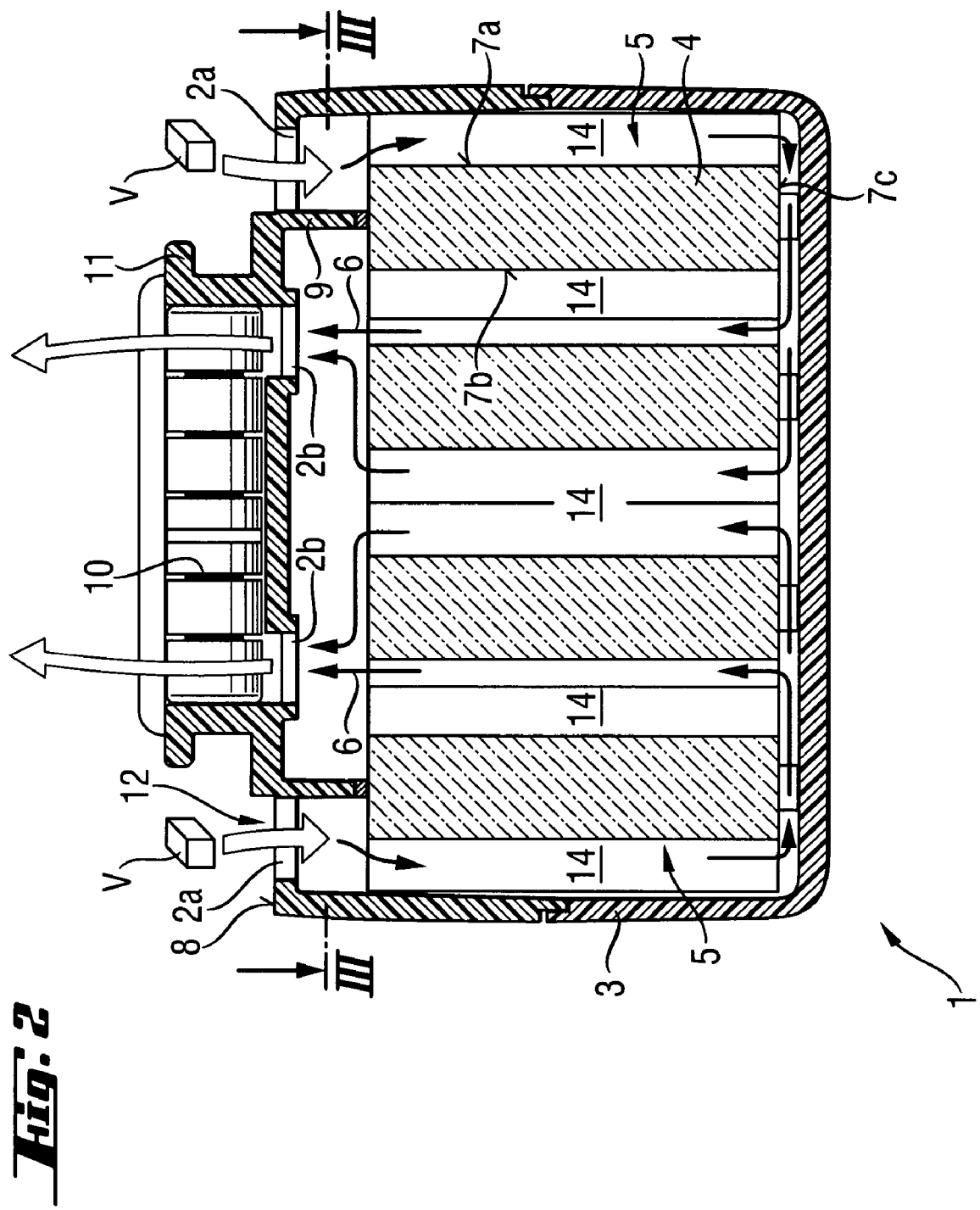
FIG. 2 a cross-sectional view along line II—II in FIG. 1.

A battery pack 1 according to the present invention, which is shown in FIGS. 1–3, includes a housing 3, a plurality of cooling openings 2a, 2b provided in the housing 3, and two separation walls 5 each formed of a plurality of current cells 4 flow-tight arranged adjacent to each other. The two separation walls 5 are arranged between respective cooling openings 2a, 2b and project into the interior of the housing 3. The two separation walls 5 are arranged in the interior of the housing 3 flow-tight with respect to the open side 8 of the housing 3. An air volume V, which is produced by a ventilator (not shown) of a charging apparatus (likewise not shown) and which enters through the first openings 2a and exits through the second openings 2b, flows, in form of an air stream 6, around respective separation walls 5 along both sides of each separation wall 5. The air stream 6 has at opposite walls 7a, 7b of each of the separation walls 5 opposite flow directions. Both the first cooling openings 2a and the second cooling openings 2b are provided at the open side 8 of the housing 3 and which is flow-tight adjoined by respective separation walls 5, with the necessary inner-side reversal of direction of flow taking place at respective end sides 7c of the separation plates 5 opposite to their sides which flow-tight adjoin the open side 8 of the housing.

The cylindrical current cells 4 are axially supported on two webs 9 which project inward from the open side 8 of the mirror-symmetrical housing 3 and which are arranged between the middle second cooling openings 2b and respective edge-side, first cooling openings 2a. The open side of the housing 3 also has electrical contact means 10 and mounting means in form of a pair of sliding rails 11. Air distribution means 12, which is formed by a plurality of spaced cooling openings 2a and provided on one side of the separation wall 5, uniformly distributes the pressure difference, which is produced by the air stream 6, between the flow channels 14 in form of a plurality of separate streams.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A battery pack, comprising a housing (3) having a plurality of cooling opening (2a, 2b) formed therein; and at least one separation wall (5) formed of a plurality of current cells (4) arranged flow-tight adjacent to each other, the at least one separation wall (5) being arranged between at least two cooling openings (2a, 2b) and projecting flow-tight into an interior of the housing (3) only at a side of the openings, whereby the at least one separation wall (5) is cooled by an air stream flowing therearound along opposite sides of the at least one separation wall (5) in opposite directions.

2. A battery pack according to claim 1, wherein the at least two openings (2a, 2b) comprises a first cooling opening (2a) and a second cooling opening (2b), the first (2a) and second (2b) cooling openings being arranged at an open side (8) of the housing (3) which is flow-tight adjoined by the separation wall (5).

3. A battery pack according to claim 2, wherein the current cells (4) are axially supported on a web (9) projecting inward from the open side (8) of the housing (3) and arranged between the first cooling opening (2a) and the second cooling opening (2b).

4. A battery pack according to claim 1, wherein the plurality of cooling openings (2a, 2b) comprises at least three cooling openings (2a, 2b), and wherein the pack comprises two separation walls (5) arranged between respective pairs of the three cooling openings.

5. A battery pack according to claim 4, wherein the cooling openings (2a, 2b) and the two separation walls (5) are symmetrically arranged in the housing.

6. A battery pack according to claim 5, wherein the cooling openings (2a, 2b) and the separation walls (5) are arranged mirror-symmetrically.

7. A battery pack according to claim 2, further comprising electrical contact means (10) provided at the open side (8) of the housing (3).

8. A battery pack according to claim 1, further comprising air distribution means (12) for uniform separation of the air stream (8) in a plurality of separate streams.

9. A battery pack, comprising a housing (3) having a plurality of cooling opening (2a, 2b) formed therein; and at least one separation wall (5) formed of a single row of current cells (4) arranged flow-tight adjacent to each other,
   wherein the plurality of cooling openings (2a, 2b) has at least one first opening (2a) and at least one second opening (2b),
   wherein the at least one separation wall (5) projects flow-tight into an interior of the housing (3) only at a side of the at least one first opening (2a) and at least one second opening (2b), and
   wherein an air volume (V), which enters through the at least one first opening (2a) and exits the at least one second opening (2b), flows, in form of an air stream (6) around the at least one separation wall (5), along opposite sides (7a, 7b) of the at least one separation wall (5) in opposite directions.

* * * * *

UNITED STATES PATENT AND TRADEMARK OFFICE
CERTIFICATE OF CORRECTION

PATENT NO. : 7,141,331 B2 Page 1 of 1
APPLICATION NO. : 10/686851
DATED : November 28, 2006
INVENTOR(S) : Ziegler et al.

It is certified that error appears in the above-identified patent and that said Letters Patent is hereby corrected as shown below:

On Title page
Item (73) Assignee: should read Hilti Aktiengesellschaft

Signed and Sealed this

Sixth Day of March, 2007

JON W. DUDAS
*Director of the United States Patent and Trademark Office*